United States Patent [19]

Valadier

[11] Patent Number: 5,731,576
[45] Date of Patent: Mar. 24, 1998

[54] SMART CARD TRANSACTION METHOD AND SYSTEM

[75] Inventor: Jean-Louis Valadier, Aubagne, France

[73] Assignee: Gemplus Card International, Gemenos, France

[21] Appl. No.: 687,353

[22] PCT Filed: Feb. 8, 1995

[86] PCT No.: PCT/FR95/00151

§ 371 Date: Jul. 30, 1996

§ 102(e) Date: Jul. 30, 1996

[87] PCT Pub. No.: WO95/22125

PCT Pub. Date: Aug. 17, 1995

[30] Foreign Application Priority Data

Feb. 9, 1994 [FR] France ................... 94 01463

[51] Int. Cl.$^6$ .............. G06K 19/06; G06K 05/00; G06F 17/60
[52] U.S. Cl. .............. 235/492; 235/380; 235/379
[58] Field of Search ................ 235/380, 379, 235/382, 375, 492; 340/825.31, 825.32, 825.33, 225.34, 225.35; 364/408, 406; 502/8, 22, 24

[56] References Cited

U.S. PATENT DOCUMENTS

| | | |
|---|---|---|
| 4,877,950 | 10/1989 | Halpern ........................ 235/380 |
| 4,906,828 | 3/1990 | Halpern ........................ 235/380 |
| 4,992,646 | 2/1991 | Collin ........................ 235/380 |
| 5,030,806 | 7/1991 | Collin ........................ 235/380 |
| 5,206,488 | 4/1993 | Teicher ........................ 235/380 |
| 5,534,683 | 7/1996 | Rankl et al. .................... 235/380 |

FOREIGN PATENT DOCUMENTS

| | | |
|---|---|---|
| 0 193 635 | 9/1986 | European Pat. Off. . |
| 0 378 454 | 7/1990 | European Pat. Off. . |
| 0 423 035 | 7/1991 | European Pat. Off. . |
| 2605770 | 4/1988 | France . |
| 2685520 | 6/1993 | France . |

*Primary Examiner*—Donald T. Hajec
*Assistant Examiner*—Thien Minh Le
*Attorney, Agent, or Firm*—Nilles & Nilles, S.C.

[57] ABSTRACT

A method of transaction replenishes a microprocessor-based card. The card computes a certificate of authenticity on the basis of data elements that it contains and that include the contents of its counter of the number of replenishment operations and its identification number. These data elements enable the card to verify its entitlement to be replenished. The card increments its counter of the number of replenishments. A replenishment terminal reads the identification number of the card and transmits to the card the data elements that pertain to it and that comprise the certificate of authenticity corresponding to it for the cycle in progress. The received certificate is compared with a certificate computed by the card. When the certificates are equal, the card accepts a replenishment of units.

7 Claims, 2 Drawing Sheets

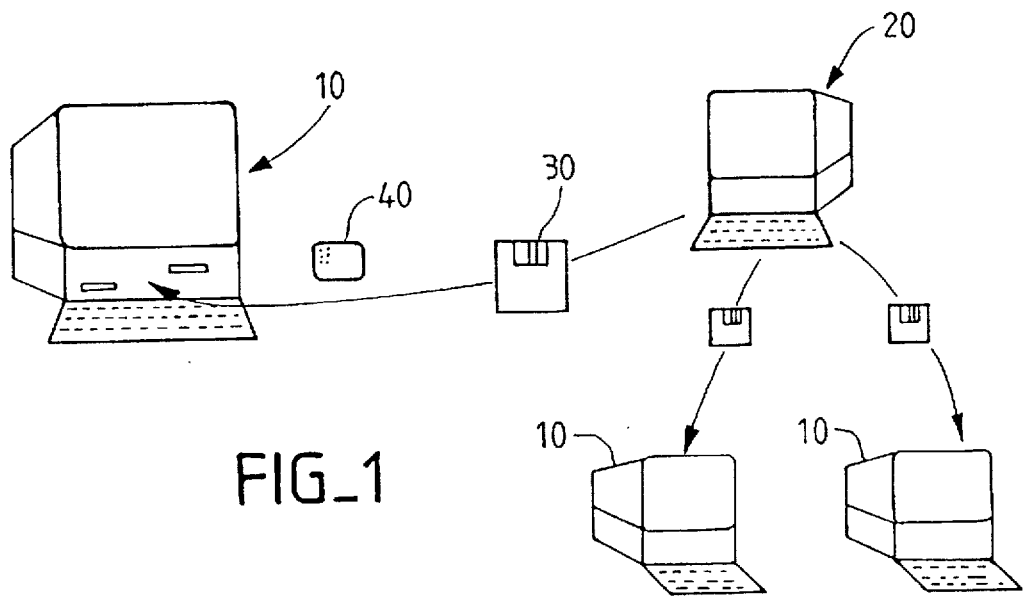
FIG_1
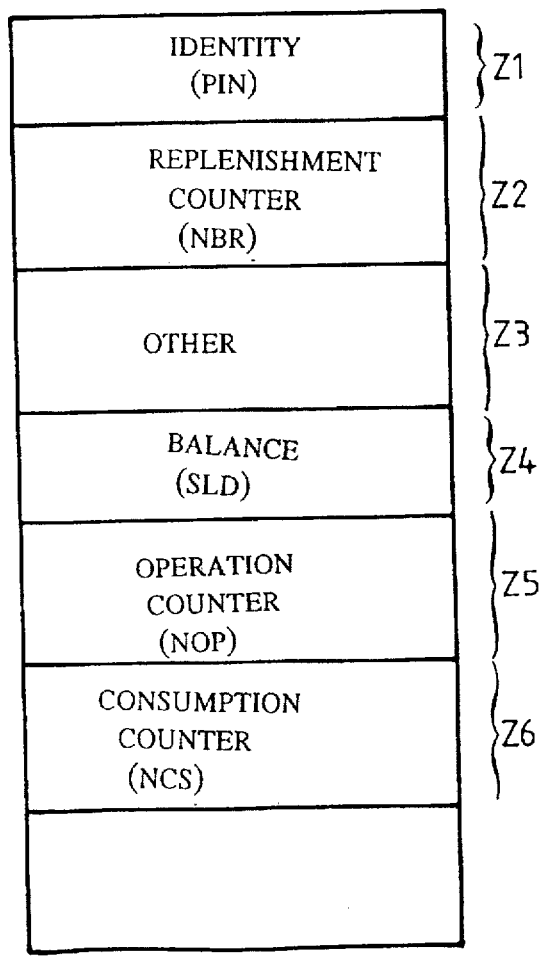
FIG_2

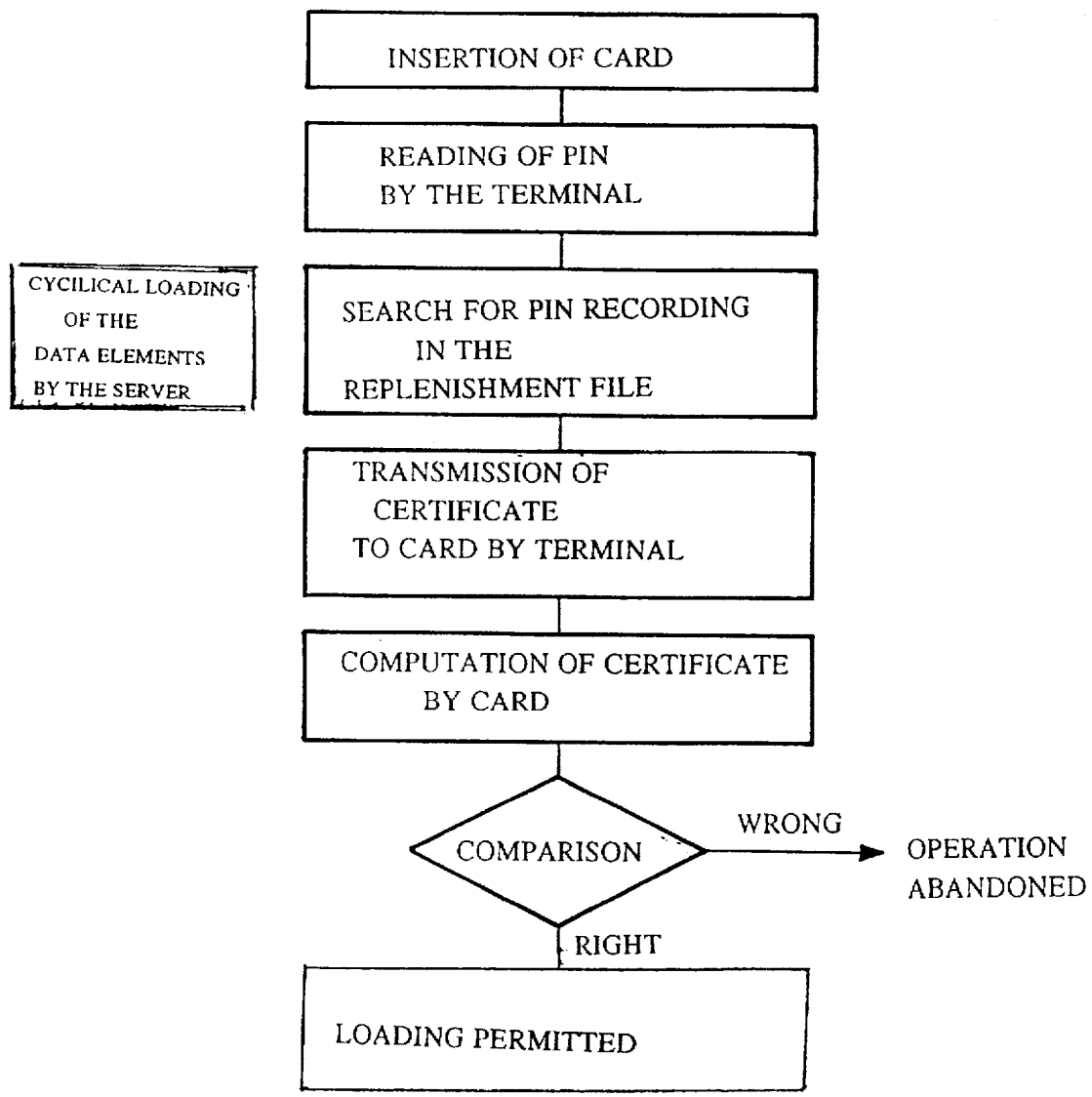

SMART CARD TRANSACTION METHOD AND SYSTEM

BACKGROUND OF THE INVENTION

The invention relates to chip cards and to systems of transaction using these cards. It relates more particularly to chip cards wherein the chip has a memory and a microprocessor. It is even possible to envisage the possibility of having at least two chips on one and the same card, one for the memory and one for the microprocessor.

A typical transaction system that uses chip cards is the electronic wallet which works as follows: a chip card belonging to a person may be replenished at a banking institution so as to contain a new fiduciary value that replaces bank notes, this person's bank account being debited by a corresponding value. This card may be used for an exchange of money with a third party (a tradesman, for example) having a similar card: a part of the money available in the first card is credited to the second card, the balance in which is thus increased. The balance in the first card is reduced accordingly. After a certain number of operations of this kind, the second card may be unloaded at a banking institution to effect the transfer of the balance in the card to an account of the holder of this card.

Another system of transaction may consist in replenishing the cards periodically at replenishment terminals distributed over a geographic area, and then in consuming goods or services by means of the card. The balance in the card decreases as and when it is used until the replenished amount is all used up. The periodically replenished amount may be fixed or variable. It may be the same amount for an entire population of card-holders, for example in one application where canteen cards are replenished at the beginning of the month with a fixed number of meals or a fixed sum of money.

The transaction systems, involving units of value as well as information elements, generally require precautions to be taken against fraud. For this purpose, they use confidential information, secret codes, algorithms for checking secret codes, information encryption algorithms, etc.

The French patent application FR-A-2 653 648 filed by the present Applicant has described secured transaction systems for chip cards that do not necessarily have any microprocessor. Essentially, the card is a memory card in which the non-volatile memory has at least four different zones. A first zone is reserved for data elements for the identification of the card (in principle there are no two cards having the same identification data elements). A second zone is reserved for a balance of account that diminishes as and when the card is used. A third zone records the number of operations performed with the card. And a fourth zone contains a certificate used to ascertain that the balance in the card has not been modified between two operations. The certificate is placed in this fourth zone by the card reader at the end of a transaction. It is computed by bringing the identity of the card, the balance and the number of operations into play. During a following use of the card, the card reader uses the same algorithm to ascertain that the certificate is truly the one corresponding to the identity of the card, the balance recorded and the number of operations recorded. If this is not so, it takes steps corresponding to the violation detected. For example it prohibits all transactions or it retains the card or it sends the identity of the card to a central server, etc.

Although this system is very simple and gives a high degree of security, it has been seen that it has drawbacks for certain cases of organization of transaction systems.

For example, one organization of transactions in which this mode of security has drawbacks is the following: when users have to replenish their card with an institution, using replenishment terminals distributed over a specified geographical area and connected to a central server, the checks are made by the server and this takes up a great deal of on-line transmission time if the users are numerous. If they all have to replenish their cards at approximately the same time, for example at the beginning of the month, the problem is even more complicated. This is a direct on-line replenishment system. The card, the replenishment terminal and the server are connected to one another during the transaction.

Thus, the solutions known to date are not satisfactory.

On the one hand, the existing solutions give rise to a congestion of the transmission network connecting the terminals to the server during the replenishment operations. This, as we have just seen, happens when a large number of users have to replenish their cards through terminals at the same time, for the replenishment operations are done on-line.

On the other hand, the existing solutions require the use of terminals having specific hardware to compute complex enciphering functions and secured means to store all the secret data elements used for these computations for all the cards that are likely to be connected to the terminal. Such solutions dictate a mutual sharing of secrets between terminal and card. This is difficult to manage and dictates the use of specific terminals for transactions of this kind.

OBJECTS AND SUMMARY OF THE INVENTION

The present invention can be used to resolve this problem and furthermore to provide all the security needed for these transactions without dictating any limitation or complications for the hardware used. Another object of the present invention is to prevent a card from being replenished from several terminals in one and the same period when this card has already been loaded from a terminal for this given period.

Thus, the present invention consequently enables the use of standard terminals without specific components designed to provide security or to prevent several replenishment operations during a given period.

The present invention proposes a simple solution in order to obtain a satisfactory degree of security for a large number of applications.

The present invention is aimed more particularly at a method of transaction using microprocessor-based cards according to which cards can be replenished in dispersed replenishment terminals (10) capable of receiving data elements from a server (20) characterized in that it comprises the following steps:

the providing of a counter in each card to count up the number of replenishment operations, the cyclical loading, from the server into the terminals, of data elements pertaining to each card including the identification numbers of the cards, a replenishment count number and a certificate of authenticity obtained through these numbers, these data elements enabling each card to verify its entitlement to be replenished, the introducing of a card into any replenishment terminal, the computation, by the card, of a certificate of authenticity on the basis of data elements that it contains including the contents of its counter of the number of replenishment operations performed on the card and its identification number, the incrementing, by the card, of its counter of the number of replenishments, the reading, by the terminal, of the identification number of the card and the transmission to the card of the data elements pertaining to it, comprising a certificate of authenticity, for the cycle in progress, the comparison of the received certificate with a certificate computed by the card, the acceptance by the card of a replenishment of units when the certificates are equal.

Thus, according to the invention, the card has a non-volatile recording zone containing the number of operations of a specified type performed by the holder of the card, this number being incremented when an operation of this type is performed but not being incremented when the card is used for operations of another type. Thus, if the card has to carry out debit operations and credit operations, a specific counter is provided for the credit operations only and another counter is provided for the debit operations only.

According to the invention, secrets necessary to carry out debit operations will thus be different from those necessary to carry out replenishment operations.

The counter of operations is irreversible, i.e. the memory zone is organized so that the contents read can correspond only to a number of units that always varies in the same direction.

The data elements pertaining to a card may further comprise the amount of the replenishment.

According to another object of the invention, the cards comprise a non-volatile memory, characterized in that the counter of the number of replenishments is made by means of a non-volatile memory zone (22) of the card in which the microprocessor records a number (NBR) representing the counting of the number of replenishment operations performed, this number being incremented irreversibly at each replenishment operation.

According to another object of the invention, the data pertaining to each card may further comprise an identification code (PIN).

According to another object of the invention, the terminal reads the contents (NBR) of the counter of a card and compares them with the replenishment count number that it possesses for the cycle in progress, and refuses to transmit data elements to the card when the contents of the counter are greater than or equal to the replenishment count number.

The invention can be applied to a system for the collective management of many canteens, each having a plurality of dispersed replenishment terminals at the disposal of the employees of an undertaking.

BRIEF DESCRIPTION OF THE DRAWINGS

Other characteristics and advantages of the invention shall appear from the reading of the following detailed description made with reference to the appended drawings, of which:

FIG. 1 shows the general organization of an application in which the present invention can be advantageously implemented;

FIG. 2 gives a schematic view of various non-volatile memory zones of a card that can be used in the method according to the invention;

FIG. 3 shows a general flow chart of the steps of a method for the replenishment of cards according to the invention.

DESCRIPTION OF THE PREFERRED EMBODIMENTS

It will be noted hereinafter that the server is not necessarily physically connected to the terminals: a magnetic memory diskette produced by the server may be conveyed into the terminals in order to place therein the data elements needed for the operations of verification to authenticate the cards.

The invention shall be described in detail with reference to a particular exemplary application (FIG. 1) which is that of the management of canteen cards. The card-holders are employees belonging to different firms or organizations, the management of the cards being carried out by a supplier of services (a catering firm).

It is assumed that all the employees of an undertaking possess an electronic wallet type card providing access to the canteen, this card being financed by the holder and/or by the undertaking.

Cyclically, and in this example every month, after having paid the provider of services a sum corresponding to the cards to be replenished, the firm receives a file from the provider of services containing all the replenishment orders for its employees. This file is designed to be used by one or more replenishment terminals 10 placed in the undertaking. If the undertaking occupies a large surface area, several terminals are distributed over this surface area so that all the employees can easily access the terminal on the day that they have to replenish their card.

The replenishment file may be transmitted by the supplier of services in different ways. For example, the transmission can be made by an on-line link or a modem link if the terminals are connected directly or by telephone lines to a server 20 of the provider of services. Or, on the contrary, the transmission can be done by the physical conveyance of a magnetic diskette 30 or any other non-volatile memory means (chip card, etc.) if the terminals are not connected to the server 20 of the provider of services.

The file transmitted by the provider of services is installed in the replenishment terminals of the undertaking. The replenishment file transmitted to the terminals may be the same for all the terminals. It is then duplicated in all these terminals.

These terminals may be simple personal computers (PCs) with a chip card reader.

Employees who wish to replenish their card 40 may go to any terminal (the invention removes the necessity for a card holder to use a specific terminal). The card is introduced into the card reader of the terminal 10 and gets loaded with the amount stipulated in advance by the provider of services. This amount may be constant for all the holders or, on the contrary, individualized for each of them. The amount may also vary as a function of the date of the replenishment.

The provider of services manages the amounts with which each card must be replenished.

The period during which the replenishment can be done may be fixed or variable. For example, it may be planned that the replenishment must be done cyclically on the first of each month.

The card thus replenished may be used for a certain number of times between two replenishment operations to consume the services offered by the canteen according to the modalities defined by the provider of services.

The description of the exemplary application here above provides a clearer understanding of the working of the invention.

In the method and system of transaction according to the invention, the card has means to count (and effect the non-volatile storage) of the number of replenishment operations performed, this counter being not incremented during the other uses of the card, namely especially when the card is used to consume services.

It will be noted that in other applications, the counter could of course memorize operations of a type other than that of replenishment: for example, operations for displaying the state of the account.

FIG. 2 gives a schematic view of different non-volatile memory zones that may be planned in the card in order to implement the invention. These zones have been shown as being different parts of one and the same non-volatile memory MNV. Naturally, these memory zones may be physically separate from each other, i.e. they are not necessarily all addressable by one and the same single address decoder. Indeed, it should clearly be understood that these different zones are not necessarily accessible in the same way. For example, certain zones such as the one containing a data element for the identification of the card are completely inaccessible in write mode while others (the one containing a balance for example) can be accessed in write mode.

FIG. 2 gives an exemplary view of a first zone Z1 containing the identification data elements (the PIN: or personal identification number) of the card. These data elements enable the unequivocal identification of the card, i.e. there are no two cards having the same identification data element.

Another zone Z2 is used as a counter of card replenishment operations and contains a number NBR that therefore represents the number of replenishment operations already performed. This zone is incremented at each replenishment operation but is not incremented when the card is used for other operations.

A fourth zone Z4 may contain a variable balance SLD, updated at the time of replenishment and gradually diminishing as and when goods or services are used up by means of the card.

A fifth zone Z5 may contain a number of operations (NOP) performed with the card. This number includes both the replenishment operations and the operations for the consumption of goods or services. However, the zone Z5 could also contain a number NCS representing only the operations for consuming goods or services, this zone being not incremented during replenishment operations. As a variant, it is possible to provide for a zone Z5 for the number NOP and a different zone Z6 for the number NCS.

Finally, other zones given the general reference Z3 may be planned in the memory MNV.

To ensure replenishment security, it will be seen to it:

firstly that the only operations possible are the operations to replenish cards of authorized holders (the supplier of services defines the authorized holders identified by the personal identification number PIN of the card);

secondly that it is not possible to carry out a double replenishment of one and the same card taking advantage of the fact that there are several terminals prepared simultaneously for operations to replenish all the holders.

For this purpose, the operation uses both the counter of replenishment operations present in the card and the identification number of the card, also present in the card. These two data elements enable the cyclical computation of the new certificate for each card, and the loading of this certificate into the terminals, this certificate being valid only for a specified card with a specified state of a counter. Each card computes its own certificate and compares it with the certificate sent to it by the terminal.

The state NBR of the replenishment counter (Z2) varies irreversibly, namely the contents of the non-volatile counter (or the contents of the memory zone constituting this counter) represent a whole number that always varies in the same direction at each new replenishment operation.

The protocol of communications between the replenishment terminal and the card proceeds as described here below. The steps are recalled in the flow chart of FIG. 3:

the holder of the card inserts his card into the replenishment terminal. The operations that follow may run on automatically without any intervention by the holder but it will be understood that, in certain cases, it may be preferred to have an intervention by the holder (especially if the terminal is a PC that could be used for other purposes);

the terminal reads the identification number of the card (PIN) in the zone Z1;

the terminal makes a search, in the replenishment file transmitted by the provider of services, for a corresponding number in order to ensure that the holder belongs to the group of holders having a priori authorization;

the terminal sends the card the certificate of authenticity that it possesses for this card;

optionally, the terminal can make a reading in the card of the contents CRT and ascertain that these contents correspond to the number of counting operations that it possesses for this card. At the end of this option, the card may be rejected if there is incompatibility between these two numbers before any verification. There would be incompatibility for example if the CRT number of the card were to be greater than the one held by the terminal;

the card receives the certificate from the terminal which carries out a reading in its replenishment file. The card carries out a computation, by means an algorithm using the identification number PIN and the contents NBR of the replenishment counter, of the theoretical certificate that ought to correspond to the certificate given inasmuch as the identification number and/or the number of replenishment operations are the same. Thus, the terminal does not possess the computation algorithm and limits itself to the procurement, from the replenishment file prepared by the server, of a certificate corresponding to the card and to the order number of the replenishment operation. The advantage of this form of procedure is that the algorithm is then present solely in the server and does not need to be present in the terminals. These terminals then cannot be used fraudulently through fabrication of the replenishment file sent to them;

the card verifies the compatibility of the received certificate and the computed certificate and permits or does not permit the replenishment operations that follow as a function of the result of the verification. In the event of non-compatibility, the steps taken may be of various kinds, for example: rejection of the card, error messages, requests for new attempts, confiscation of the card at the end of several failed attempts, the storage, in a file, of attempts at fraud, the number of the card giving rise to these failures, etc.

The card permits the replenishment and increments its transaction counter. The incrementing of the counter could be done even before the replenishment has taken place or has been permitted, thus enabling a fraudulent act to be detected. The counter of the number of replenishment operations could, for example, be incremented as soon as a user seeks to have his card replenished.

In the event of success of the verification, the terminal or the card carries out the replenishment operation: this is an updating of the non-volatile memory zone Z4 representing an available credit (in terms of sums of money, units of account, number of meals, etc.). If need be, this updating is performed by totalizing the units added along with the balance of the units present in the card.

The computation of the certificate by the card will bring into play the identification of the card, and the new contents of the counter of replenishment operations (or the former contents incremented by one unit).

For this purpose, the card naturally has the algorithm for computing the certificate, as does the server which provides the certificates to the terminals.

When the card has successfully undergone the replenishment procedure, it can be used for operations for consuming goods or services (the consumption of meals in the canteen).

The terminal for its part records an information element in the replenishment file or in another file indicating that, for this card, the replenishment operation has been performed. This information will be transmitted subsequently to the server of the provider of services.

If the user now goes to another replenishment terminal, during the same replenishment period, with his already replenished card, the replenishment procedure cannot recur normally since the contents of the operations counter as well as of the certificate will have changed. The irreversibility of the counter will prevent any fraud: it is not possible to restore the contents of the zone Z2 to their previous value when they have changed.

It may happen that a user has not replenished his card at the end of the period during which the replenishment should have taken place. In this case, the next replenishment operations will become difficult to manage.

In order that this situation may be managed more easily, it can be planned that the replenishment file sent to the terminals will comprise several recordings for each card, one corresponding to the replenishment operation in progress and the other to the last theoretical replenishment operations that should have been performed and that in fact have not been performed. For a given card number, there is therefore at least one recording comprising an information element on the contents of the counter corresponding to the theoretical operation in progress, with a corresponding certificate, but also possibly for certain cards, two recordings (or more) with one and the same card number, and several successive counter contents (as many as there are non-performed replenishment operations), and corresponding certificates.

In this case, the terminal continues to seek the recording that corresponds to the number of replenishment operations indicated in the card. Indeed, it is the replenishment operation corresponding to this number that must be performed first. The previous ones are assumed to have been made since the card has been incremented up to this set of contents. Those that follow have to be performed only subsequently. The replenishment procedure can then be performed normally with respect to this recording. When it is done, the holder may again carry out a replenishment operation, for example the last one if there had been only a single delayed recording. This new replenishment operation can be performed in the same terminal or in another one.

Here above, it has been assumed that the identification number of the card and the contents of the replenishment counter are used directly to compute the certificate of authenticity. However, it can also be planned to use these elements to prepare keys for the encryption of transmission between the card and the terminal, and not only the certificate.

The main steps described here above and recalled in FIG. 3 represent a simple transaction procedure. It goes without saying that procedures of greater complexity could be implemented in order to increase security. For example, the authentication of the card may be reinforced by a method of verification of a secret code requested by the terminal and entered by the user at the keyboard of the replenishment terminal.

To obtain an irreversible counter using a memory zone Z2, it is now standard practice to use non-volatile memories whose cells can be programmed successively one after the other, with erasure being impossible. The programming can be done under the control of a microprocessor when the card has one, or under the control of simple circuits when there is no microprocessor.

Finally, it will be understood that if the card has several counters for different types of operations, such as those corresponding to the zones Z2 and Z6, the contents of each of these counters may be used for verification procedures for the different types of operations performed with the card.

It will be understood from the exemplary application described in detail here above that the invention is particularly applicable to a system for the collective management of several canteens each having several replenishment terminals at the disposal of the employees of the undertaking. It can furthermore be easily transposed to any other type of service.

I claim:

1. Method of transaction using microprocessor-based cards according to which cards can be replenished in dispersed replenishment terminals (10) capable of receiving data elements from a server (20) and according to which there is provided a counter in each card to count up the number of replenishment operations, the method of transaction comprising the following steps:

the cyclical loading, from the server into the terminals, of data elements pertaining to each card including, for each card, an identification number enabling it to be identified, a replenishment count number for the cycle in progress and a certificate of authenticity obtained through these numbers, these data elements enabling each card to verify its entitlement to be replenished, and during an operation of replenishment:

the introduction of a card (40) into any replenishment terminal, the computation, by the card, of a certificate of authenticity on the basis of data elements that it contains and that include the contents of its counter of the number of replenishment operations and its identification number, the incrementing, by the card, of its counter of the number of replenishments, the reading, by the terminal, of the identification number of the card and the transmission to the card of the data elements that pertain to it and that comprise the certificate of authenticity corresponding to it for the cycle in progress, the comparison of the received certificate with a certificate computed by the card, the acceptance by the card of a replenishment of units when the certificates are equal.

2. Method of transaction using microprocessor-based cards according to which cards can be replenished in dispersed replenishment terminals (10) capable of receiving data elements from a server (20) and according to which there is provided a counter in each card to count up the number of replenishment operations, the method of transaction comprising the following steps:

the cyclical loading, from the server into the terminals, of data elements pertaining to each card including, for each card, an identification number enabling it to be identified, a replenishment count number for the cycle in progress and a certificate of authenticity obtained through these numbers, these data elements enabling each card to verify its entitlement to be replenished, and during an operation of replenishment:

the introduction of a card (40) into any replenishment terminal, the reading, by the terminal, of the identification number of the card and the transmission to the card of the data elements that pertain to it and that comprise the certificate of authenticity corresponding to it for the cycle in progress, the computation, by the card, of a certificate of authenticity on the basis of data elements that it contains and that include the contents of its counter of the number of replenishment operations and its identification number, the incrementing, by the card, of its counter of the number of replenishments, the comparison of the received certificate with a certificate computed by the card, the acceptance by the card of a replenishment of units when the certificates are equal.

3. Method of transaction according to claim 1, characterized in that the data elements pertaining to a card further comprise the amount of the replenishment.

4. Method of transaction according to claim 1, in which the cards comprise a non-volatile memory, characterized in that the counter of the number of replenishments is made by means of a non-volatile memory zone (22) of the card in which the microprocessor records a number (NBR) representing the counting of the number of replenishment operations performed, this number being incremented irreversibly at each replenishment operation.

5. Method of transaction according to claim 1, characterized in that the data elements pertaining to each card may further comprise an identification code (PIN).

6. Method of transaction according to claim 1, characterized in that the terminal reads the contents (NBR) of the counter of a card and compares them with the replenishment count number that it possesses for the cycle in progress, and refuses to transmit data elements to the card when the contents of the counter are greater than or equal to the replenishment count number.

7. Use of the method of transaction according to claim 1, in a system for the collective management of many canteens each having a plurality of dispersed replenished terminals at the disposal of the employees of an undertaking.

* * * * *